(12) United States Patent
Li et al.

(10) Patent No.: US 12,177,512 B2
(45) Date of Patent: Dec. 24, 2024

(54) VIDEO PROCESSING METHOD AND APPARATUS, ELECTRONIC DEVICE, AND STORAGE MEDIUM

(71) Applicant: Beijing Zitiao Network Technology Co., Ltd., Beijing (CN)

(72) Inventors: Jiayi Li, Beijing (CN); Menglin Wu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/497,699

(22) Filed: Oct. 30, 2023

(65) Prior Publication Data
US 2024/0064367 A1    Feb. 22, 2024

Related U.S. Application Data

(63) Continuation of application No. PCT/CN2022/090323, filed on Apr. 29, 2022.

(30) Foreign Application Priority Data

Apr. 30, 2021   (CN) .......................... 202110481918.2

(51) Int. Cl.
*H04N 21/431* (2011.01)
*H04N 21/233* (2011.01)
*H04N 21/845* (2011.01)

(52) U.S. Cl.
CPC ....... *H04N 21/4318* (2013.01); *H04N 21/233* (2013.01); *H04N 21/8456* (2013.01)

(58) Field of Classification Search
None
See application file for complete search history.

(56) References Cited

U.S. PATENT DOCUMENTS 10,805,665 B1   10/2020   Sangoli
2004/0027369 A1   2/2004   Kellock et al.
(Continued)

FOREIGN PATENT DOCUMENTS

CN   104469543 A   3/2015
CN   110379428 A   10/2019
(Continued)

OTHER PUBLICATIONS

International Search Report in PCT/CN2022/090323, mailed Jun. 27, 2022, 14 pages.
(Continued)

*Primary Examiner* — Alexander Q Huerta
(74) *Attorney, Agent, or Firm* — Astute IP Law Group

(57) ABSTRACT

A video processing method and apparatus, an electronic device, and a storage medium are provided. The method comprises: in response to a triggering operation acting on a first control in a video editing interface, displaying a first operation region for a first object; in response to an operation acting on the first operation region, displaying a first feature of the first object in the first operation region; and adding a second object with a second feature to a target video, to present the second object according to the second feature during a process of playing the target video, wherein the second feature corresponds to the first feature.

18 Claims, 6 Drawing Sheets

(56) References Cited

U.S. PATENT DOCUMENTS

| | | | |
|---|---|---|---|
| 2005/0210393 A1* | 9/2005 | Maeng | G06F 16/4393 715/752 |
| 2007/0245243 A1* | 10/2007 | Lanza | H04N 7/17318 715/205 |
| 2009/0094520 A1* | 4/2009 | Kulas | G06F 16/7867 707/999.102 |
| 2009/0300475 A1* | 12/2009 | Fink | H04N 21/4781 726/4 |
| 2009/0319885 A1* | 12/2009 | Amento | G06Q 10/10 715/230 |
| 2009/0327856 A1* | 12/2009 | Mouilleseaux | G06F 16/70 715/230 |
| 2012/0096357 A1* | 4/2012 | Folgner | H04N 21/658 715/726 |
| 2012/0102387 A1* | 4/2012 | Badoiu | G11B 27/105 715/230 |
| 2013/0145269 A1* | 6/2013 | Latulipe | G06F 3/048 715/720 |
| 2014/0092127 A1* | 4/2014 | Kruglick | G06T 11/60 345/629 |
| 2014/0281997 A1 | 9/2014 | Fleizach et al. | |
| 2014/0325557 A1* | 10/2014 | Evans | H04N 21/458 725/32 |
| 2018/0300291 A1 | 10/2018 | Lee et al. | |
| 2019/0057722 A1* | 2/2019 | Key | H04N 21/25866 |
| 2019/0104259 A1 | 4/2019 | Angquist et al. | |
| 2019/0235741 A1* | 8/2019 | Junee | G11B 27/034 |
| 2022/0093132 A1 | 3/2022 | Ge | |

FOREIGN PATENT DOCUMENTS

| | | |
|---|---|---|
| CN | 110933330 A | 3/2020 |
| CN | 111787395 A | 10/2020 |
| CN | 112188266 A | 1/2021 |
| CN | 112258240 A | 1/2021 |
| CN | 112367551 A | 2/2021 |
| CN | 113207025 A | 8/2021 |
| WO | 2019037615 A1 | 2/2019 |
| WO | 2020051881 A1 | 3/2020 |

OTHER PUBLICATIONS

First Office Action in CN202110481918.2, mailed Apr. 25, 2022, 9 pages.

Extended European Search Report for European Patent Application No. 22795022.7, mailed Aug. 29, 2024, 8 pages.

* cited by examiner

VIDEO PROCESSING METHOD AND APPARATUS, ELECTRONIC DEVICE, AND STORAGE MEDIUM

This application is a continuation application of International Patent Application No. PCT/CN2022/090323 filed on Apr. 29, 2022, which claims the benefit of Chinese Patent Application No. 202110481918.2, entitled "VIDEO PROCESSING METHOD AND APPARATUS, ELECTRONIC DEVICE, AND STORAGE MEDIUM", filed on Apr. 30, 2021 with the China National Intellectual Property Administration, both of which are incorporated herein by reference in entireties.

FIELD

The present disclosure relates to the field of information technology, and in particular to a video processing method and apparatus, an electronic device, and a storage medium.

BACKGROUND

In order to improve the effect of video processing, users can edit their original videos through video applications, such as saving their favorite video clips, or splicing two videos captured at different times.

However, the video editing functions provided by existing video applications are simple, which cannot meet the diverse editing needs of users and lowers the user experience. Hence, it is required to further improve the video editing functions of the video applications.

SUMMARY

In order to solve the above technical problems or at least partly solve the above technical problems, a video processing method and apparatus, an electronic device, and a storage medium are provided according to the present disclosure, which can add a second object with a second feature, which corresponds to a real-time inputted first object with a first feature, into a target video, to achieve the effect of displaying the second object with the second feature during a process of playing the target video.

A video processing method is provided according to the embodiments of the present disclosure, the method includes:
  in response to a triggering operation acting on a first control in a video editing interface, displaying a first panel; wherein the first panel includes a first operation region for a first object;
  in response to an operation acting on the first operation region, displaying a first feature of the first object in the first operation region;
  acquiring a second feature of a second object corresponding to the first feature; and
  adding the second object with the second feature to a target video, to present the second object according to the second feature while playing the target vide.

A video processing apparatus is further provided according to the embodiments of the present disclosure, the apparatus includes:
  a first display module, configured to display a first panel in response to a triggering operation acting on a first control in a video editing interface; where the first panel includes a first operation region for a first object;
  a second display module, configured to display a first feature of the first object in the first operation region in response to an operation acting on the first operation region;
  a first acquisition module, configured to acquire a second feature of a second object corresponding to the first feature; and
  a first addition module, configured to add the second object with the second feature to a target video, to present the second object according to the second feature during a process of playing the target video.

An electronic device is further provided according to the embodiments of the present disclosure, the electronic device includes: one or more processors; a storage, configured to store one or more programs; where the one or more programs, when executed by the one or more processors, cause the one or more processors to the implement the video processing method described above.

A computer readable store medium storing a computer program thereon is further provided according to the embodiments of the present disclosure, where the computer program, when executed by a processor, implements the video processing method described above.

A computer program product is further provided according to the embodiments of the present disclosure. The computer program product includes computer programs or computer instructions; where the computer programs or computer instructions, when executed by a processor, implement the video processing method described above.

BRIEF DESCRIPTION OF THE DRAWINGS

In conjunction with the drawings and with reference to the following embodiments, the above and other features, advantages and aspects of the embodiments of the present disclosure are more apparent. The same or similar reference numerals represent the same or similar elements through the drawings. It should be understood that the drawings are schematic and the components and elements are unnecessarily drawn to scale.

DETAILED DESCRIPTION OF EMBODIMENTS

Figure 1:
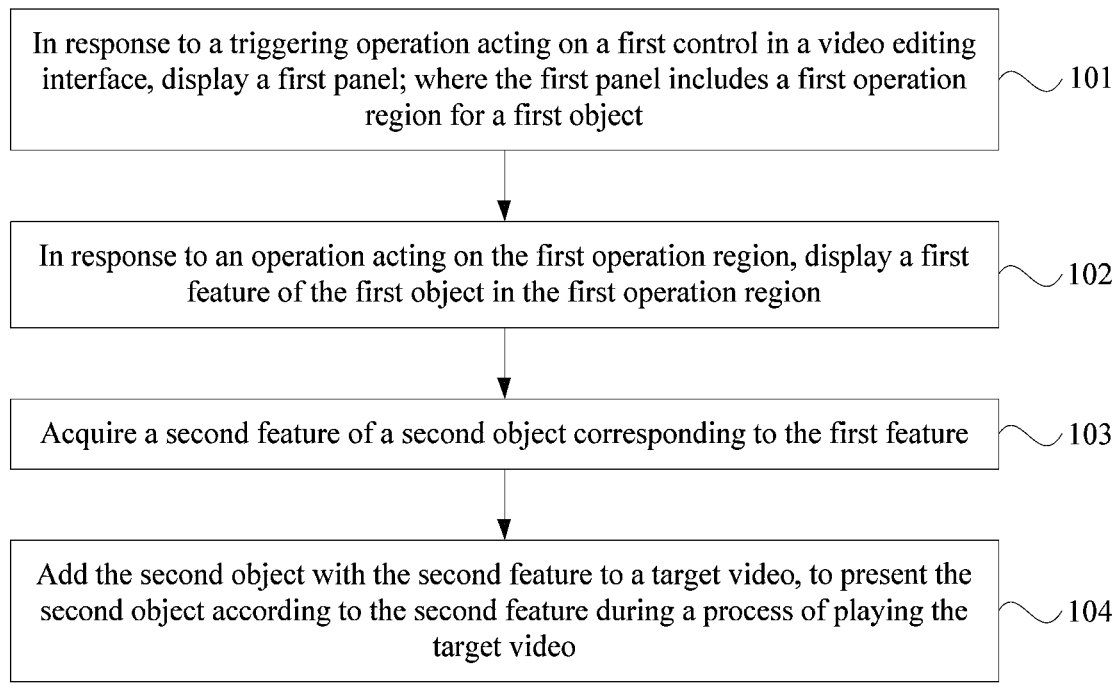
FIG. 1 is a schematic flowchart of a video processing method according to an embodiment of the present disclosure.

The embodiments of the present disclosure are described in detail below with reference to the drawings. Although some embodiments of the present disclosure are shown in the drawings, it should be understood that the present disclosure may be implemented in various forms and should not be limited to the embodiments described herein. Rather, the embodiments are provided for thoroughly and completely understanding the present disclosure. It should be understood that the drawings and the embodiments of the present disclosure are exemplary and are not intended to limit the protection scope of the present disclosure.

It should be understood that the steps in the method embodiments of the present disclosure may be performed in different orders and/or in parallel. In addition, the method embodiments may include an additional step and/or a step shown herein may be omitted. The scope of the present disclosure is not limited in this aspect.

The term "include" and its variations in the present disclosure means open-ended inclusion, i.e., "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that the wordings such as "first" and "second" used in the present disclosure are used to distinguish different apparatuses, modules or units, and are not used to limit a sequential order or interdependence of the functions performed by the apparatuses, modules or units.

It should be noted that the wordings such as "one" and "multiple" used in the present disclosure are illustrative and not restrictive. Those skilled in the art should understand that the wordings should be understood as "one or more" unless otherwise expressly indicated in the context.

The names of messages or information exchanged between multiple apparatuses in the embodiments of the present disclosure are only for illustrative purposes, and are not intended to limit the scope of the messages or information.

FIG. 1 is a schematic flowchart of a video processing method according to an embodiment of the present disclosure. This embodiment can be applied to the case of processing videos in a client. The method can be implemented by a video processing apparatus, which may be implemented in the form of software and/or hardware. The apparatus can be configured in an electronic device, such as a terminal, specifically including but not limited to a smart phone, a handheld computer, a tablet computer, a wearable device with a display screen, a desktop, a laptop, an all-in-one computer, a smart home device, etc.

As shown in FIG. 1, in this embodiment, the method may include the following step 101 to step 104 as follows.

In step 101, in response to a triggering operation acting on a first control in a video editing interface, a first panel is displayed. The first panel includes a first operation region for a first object.

In an embodiment, the first control may be displayed in the video editing interface. When the user desires to edit a target video, the user may enter the video editing interface by initiating a specific video application (i.e., client), and then trigger the first control displayed in the video editing interface to invoke the first panel. The first panel includes a first operation region for the first object. The user may operate the first object in the first operation region, such as inputting the first object, selecting the first object, etc. The first object may be text, a voice, an animation, etc. The user interacts with the system in the first operation region to operate the first object. For example, the user may input text or a voice through the first operation region, or select existing text or existing voice through the first operation region.

In one embodiment, the video application is a video capturing application or a video posting application. Before step 101, the method may further include: in response to a capture triggering operation acting on a video capturing interface, capturing the target video; in response to an edit triggering operation acting on the target video, entering the video editing interface.

In one embodiment, the first control is a text-to-speech control, the first object is text, and the first operation region is a text input region; accordingly, in an embodiment, step 101 may include: in response to a triggering operation acting on the text-to-speech control in the video editing interface, displaying a first panel, where the first panel includes a text input region.

In step 102, in response to an operation acting on the first operation region, a first feature of the first object is displayed in the first operation region.

The first feature is a feature corresponding to the first object. If the first object is text, correspondingly, the first feature is text content; when the first object is a voice, the first feature is voice content; and if the first object is an animation, the first feature is animation content.

In one embodiment where the first object is text, the first feature is the text content, and the first operation region is a text input region, the step 102 may include: in response to an operation in the text input region, displaying the text content in the text input region. In other words, in a case that the user inputs text in the first operation region, the text content inputted by the user is displayed in the first operation region, which facilitates the user to preview the text content and modify the input text content as required.

In step 103, a second feature of a second object corresponding to the first feature is acquired.

The second object may be an object of a different type from the first object, and the second object may refer to text, a voice, an animation, a special effect, etc. When the first object is text and the first feature is text content, the second object may be a voice (which corresponds to the text of the first object), and the second feature is the voice content (which corresponds to the text content of the first feature). In this case, in the step 103, a voice which has voice content corresponding to the text content is acquired. Apparently, the present disclosure is not limited thereto. In an embodiment, the second object may be an animation and the second feature is the animation content (e.g., the first object is text about "long-press on like button", and the second object is the animation content about "long-press on like button"). In this case, in the step 103, the animation which has animation content corresponding to the text content is acquired. Correspondingly, the first control is a text-to-animation control.

The above illustration is made by referring to examples of text-to-speech and text-to-animation, and speech-to-text, voice-to-animation or the like are applicable. The specific processes are similar to text-to-speech, which are not repeated here.

In step 104, the second object with the second feature is added to a target video, to present the second object according to the second feature during a process of playing the target video.

In a case of text-to-speech, the resultant voice is added to the target video and synthesized with the target video, so that the voice corresponding to the inputted text content may be presented during a process of playing the target video. In a case of text-to-animation, the resultant animation is added to the target video and synthesized with the target video, so that the animation corresponding to the inputted text content may be displayed during a process of playing the target video. In this way, in the case that the user only inputs text, voice corresponding to the text can be added to the target video; there is no need for the user to input the voice, which meets the diverse needs of the user, improves the interactive function, and enhances the user experience.

Further, in a case where the first object is text, the first feature is text content, the second object is a voice and the second feature is voice content, the step 104 may include: adding the voice to the target video, to play the voice during a process of playing the target video. In a case where the first object is text, the first feature is text content, the second object is an animation and the second feature is the animation content, the step 104 may include: adding the animation to the target video, to play the animation during a process of playing the target video.

In a case that the first object is text and the first operation region is a text input region, a text input box may be displayed in the first operation region. In response to a triggering operation (such as a click) acting on the text input box, a keyboard may be called up. In response to a triggering operation acting on the keyboard, the text inputted through the keyboard may be presented in the text input box, so that the content of the text can be acquired in response to the operation acting on the first operation region. In a case that the first object is a voice and the first operation region is a voice input region, an icon of a microphone may be displayed in the first operation region. In response to the triggering operation (e.g., long press) acting on the microphone icon, the voice is inputted, so that the content of the voice can be acquired in response to the operation acting on the first operation region.

In one implementation, the first panel further includes a second operation region for the second object. The video processing method further includes: in response to an operation acting on the second operation region, acquiring a third feature of the second object, and adding the second object with the second feature and the third feature to the target video, to present the second object according to the second feature and the third feature during a process of playing the target video.

As an example, in a case of text-to-speech, the first object is text, the first feature corresponding to the first object is text content, the second object is a voice, the second feature corresponding to the second object is voice content, and then the third feature corresponding to the second object may be a timbre of the voice. In an embodiment, the second object with the second feature and the third feature refers to a voice with a specific timbre. The second operation region for the second object may be a voice timbre selection region. The timbre selection region may display icons for different timbres, which may include: an icon for rap timbre, an icon for purity timbre, an icon for timbre of man, an icon for timbre of girl, an icon for timbre of boy's voice, an icon of monster timbre, and an icon for timbre of young girl, etc. The user may select a timbre (for example, a timbre of girl) as the target timbre from the different timbre icons. After selecting, a voice corresponding to the text content is generated with the target timbre, and the voice with the target timbre may be added to the target video, to play the voice with the target timbre during the process of playing the target video. In addition, a timbre may be preset as a default timbre. After the user triggers the text-to-speech control and inputs the corresponding text without selecting the timbre, the corresponding voice may be played with the default timbre.

In one implementation, a preview window is presented on the video editing interface. Before adding the second object with the second feature and the third feature to the target video, the method further includes: in response to the operation acting on the second operation region, playing, in the preview window, a video clip in the target video that matches a position for adding the second object with the second feature and the third feature, and synchronously presenting the second object with the second feature and the third feature.

As an example, in a case of text-to-speech, the second operation region is a timbre selection region. When the user selects a target timbre in the timbre selection region, a video clip in the target video, that matches a position for adding the target audio with the target timbre, is played in the preview window, and the target audio with the target timbre is simultaneously presented. In other words, the text context inputted by the user in the text input region is read in the target timbre. When the user changes the timbre and selects another target timbre, the video clip in the target video that matches a position for adding the target audio with the target timbre is played in the preview window, being read in the changed timbre.

In an embodiment, the in response to the operation acting on the second operation region, playing, in the preview window, the video clip in the target video that matches the position for adding the second object with the second feature and the third feature, and synchronously presenting the second object with the second feature and the third feature includes: in response to the selection operation for the target timbre in the second operation region, playing the video clip corresponding to the target audio (the timbre of the target audio is the selected target timbre) in the preview window, and playing the target audio with the target timbre.

For example, the target text is the text content about "clouds are floating, and the deer is running happily", the target voice is a piece of audio with a purity timbre about "clouds are floating, and the deer is running happily", the user adds the target text to the $5^{th}$ to $10^{th}$ second of the target video, i.e., the target text corresponds to the video clip from the $5^{th}$ to $10^{th}$ second of the target video. Correspondingly, the position for adding the generated target audio also corresponds to the video clip from the $5^{th}$ to the $10^{th}$ second. In response to the user selecting the purity timbre, the video clip from the $5^{th}$ to the $10^{th}$ second of the target video is played in the preview window, while playing the audio of "clouds are floating, and the deer is running happily" in the purity timbre simultaneously. In a case that the user performs another timbre change operation, such as changing to a little loli timbre, in response to the user selecting the little loli timbre, the video clip (i.e., the target video clip) from the $5^{th}$ to the $10^{th}$ second of the target video is played in the preview window, while simultaneously playing the audio of "clouds are floating, and the deer is running happily" in the little loli timbre. In a case that the user then performs an operation to change the position for adding the target text, for example, adding the target text to video clip from the $15^{th}$ to the $20^{th}$ second of the target video, in response to the user selecting the purity timbre, the video clip from the $15^{th}$ to the $20^{th}$ second of the target video is played in the preview window with simultaneously playing the audio of "clouds are floating, and the deer is running happily" in the purity timbre.

Figure 2:
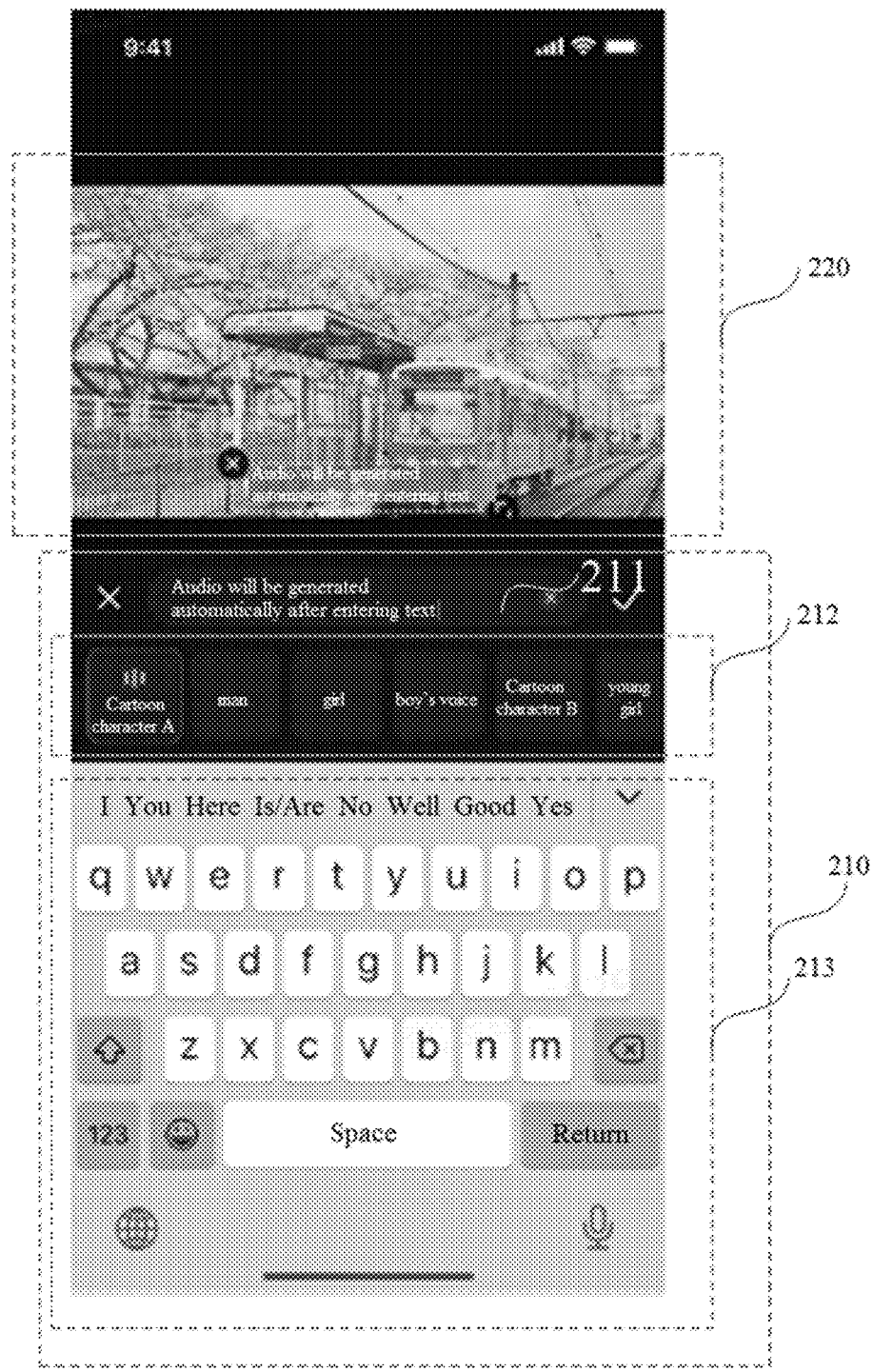
FIG. 2 is a schematic diagram of a video editing interface according to an embodiment of the present disclosure.

In one embodiment, the inputted target text content of "clouds are floating, and the deer is running happily" may also be displayed in the video footage of the played video clip, that is, the text content "clouds are floating, and the deer is running happily" is also added to the target video to enhance the display effect of the video. The text content "clouds are floating, and the deer is running happily" may be subtitles of the target video, the original text, or the text inputted by the user through the first operation region. In a case that the text content is inputted by the user through the first operation region (in this case, the first operation region may be a text input region), referring to the schematic diagram of a video editing interface as shown in FIG. 2, the video editing interface displays the first panel 210 including a text input region 211, a timbre selection region 212 and a preview window 220. In an embodiment, the text input region 211 may be a text input box. The user can call up the keyboard 213 by clicking on the text input box. The text content "clouds are floating, and the deer is running happily" may be entered in the text input box 211 through keyboard 213, and then the purity timbre is selected through the timbre selection region 212. Then, the target video clip is played in the preview window 220 while simultaneously playing the voice of "clouds are floating, and the deer is running happily" with the purity timbre, and the text content "clouds are floating, and the deer is running happily" is played in the played footage. In this way, the user may preview in advance the effect of adding the target audio to the target video, that is, the editing effect of the target video, before the target video is synthesized with the target audio. If the user is not satisfied with the editing effect, the user may make adjustment to the editing operations in time, instead of viewing the complete editing effect until all editing operations are completed (audio addition confirmation operation), which can save time for the user, improve the editing efficiency for the user, and eliminate complex operations of repeated interface switching. Continuing to refer to FIG. 2, if the user switches to select other timbre icons, in response to the operation of the user, the timbre to which the user switches is used to generate the target audio for the text content "clouds are floating, and the deer is running happily", and the target audio is added to the target video. Every time the user clicks on a timbre icon of a new target timbre, the system can read the text content with the new target timbre, so that the user can know in advance the playing effect of the generated target audio, which is convenient for the user to determine whether to switch to other timbres based on their own preferences. If the user is satisfied with the currently generated target audio, the user may add the target audio to the target video by triggering the confirmation command. If the user is not satisfied with the currently generated target audio, the user may change the timbre of the target audio by switching to other timbres. In response to the editing completion operation triggered by the user, the target audio in the corresponding timbre is added to the target video, to synthesize into a to-be-posted video. Each time the user switches the target timbre, the user may view the effect of adding the target audio in the target timbre to the target video in the preview window 220, that is, the video clip in the target video that matches the position for adding the target audio is played in the preview window 220 and the target audio is played synchronously, i.e., the editing effect of the target video is presented in advance. If the user is not satisfied with the editing effect, the editing operation may be adjusted in time, instead of viewing the comprehensive editing effect until all editing operations are completed, which can save time for the user and improve the editing efficiency for the user. It should be noted that in the preview window 220, the target video and the target audio are played synchronously, i.e., when the text content is read with the target timbre, the video clip that match the position for adding the target audio is played synchronously, rather than the case of the video footage remaining static, to present the user with the comprehensive video editing effect, i.e., the comprehensive effect of adding the target audio to the target video.

In one implementation, the video processing method may further include: adding a first object with the first feature to the target video, to display the first object with the first feature on played video footage during a process of playing the target video. As an example, in a case of text-to speech, the adding the first object with the first feature to the target video to display the first object with the first feature on the played video footage during a process of playing the target video includes: adding the text content to the target video to display the text content on the played video footage during a process of playing the target video. Still, as an example, the target audio is the voice about "clouds are floating, the deer is running happily" with the purity timbre, while adding the voice to the target video, the text content "clouds are floating, the deer is running happily" may also be added to the target video. In this way, video clip including the footage of "deer running" and "clouds in the sky" is presented in the preview window; at the same time, the text content "clouds are floating, and the deer is running happily" is displayed in the video clip while playing the voice of "clouds are floating, the deer is running happily" with the purity timbre, which can further enhance the effect of the video.

The technical solution of this embodiment achieves the purpose of adding target audio to the target video and enriches the editing effect of the target video. In addition, the target audio can be generated based on the text content inputted by the user, achieving the purpose of adding an audio corresponding text while adding the text to the target video.

Figure 3:
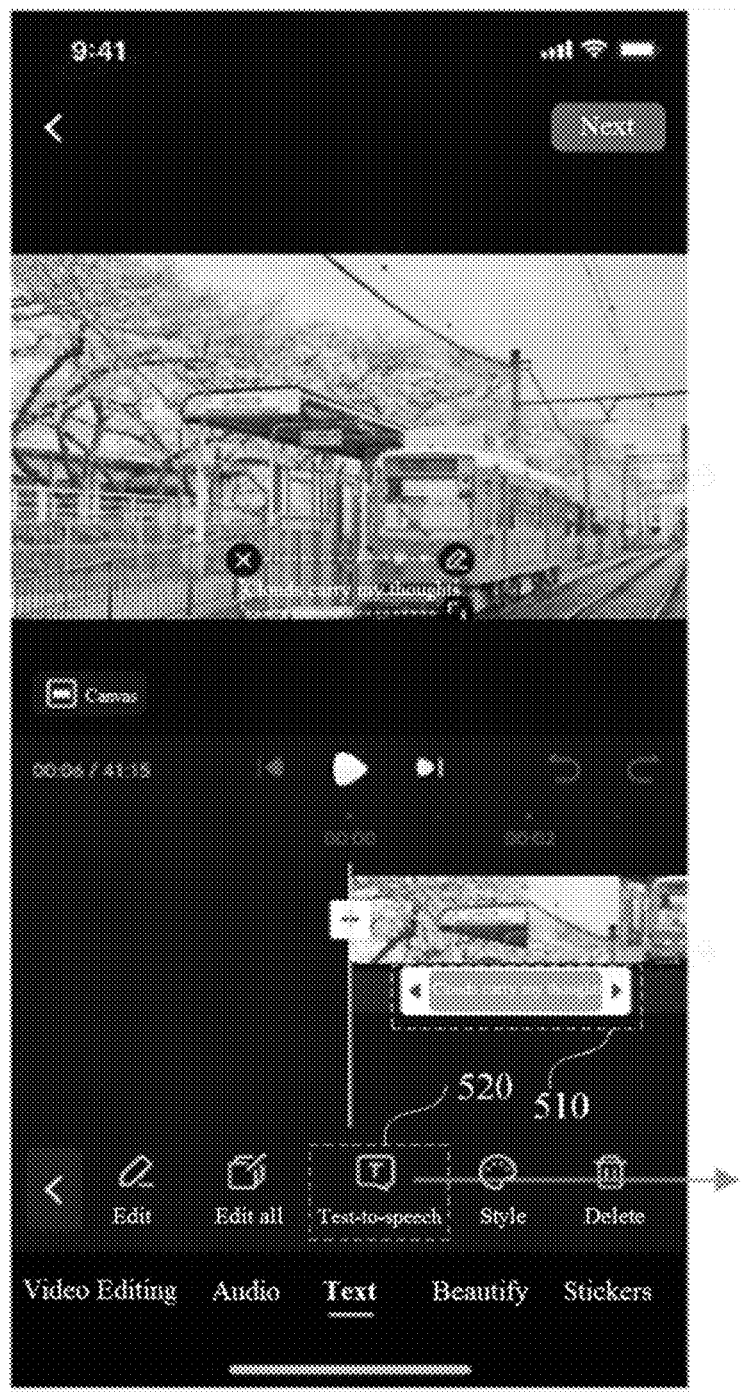
FIG. 3 is a schematic diagram of a video editing interface according to an embodiment of the present disclosure.
Figure 4:
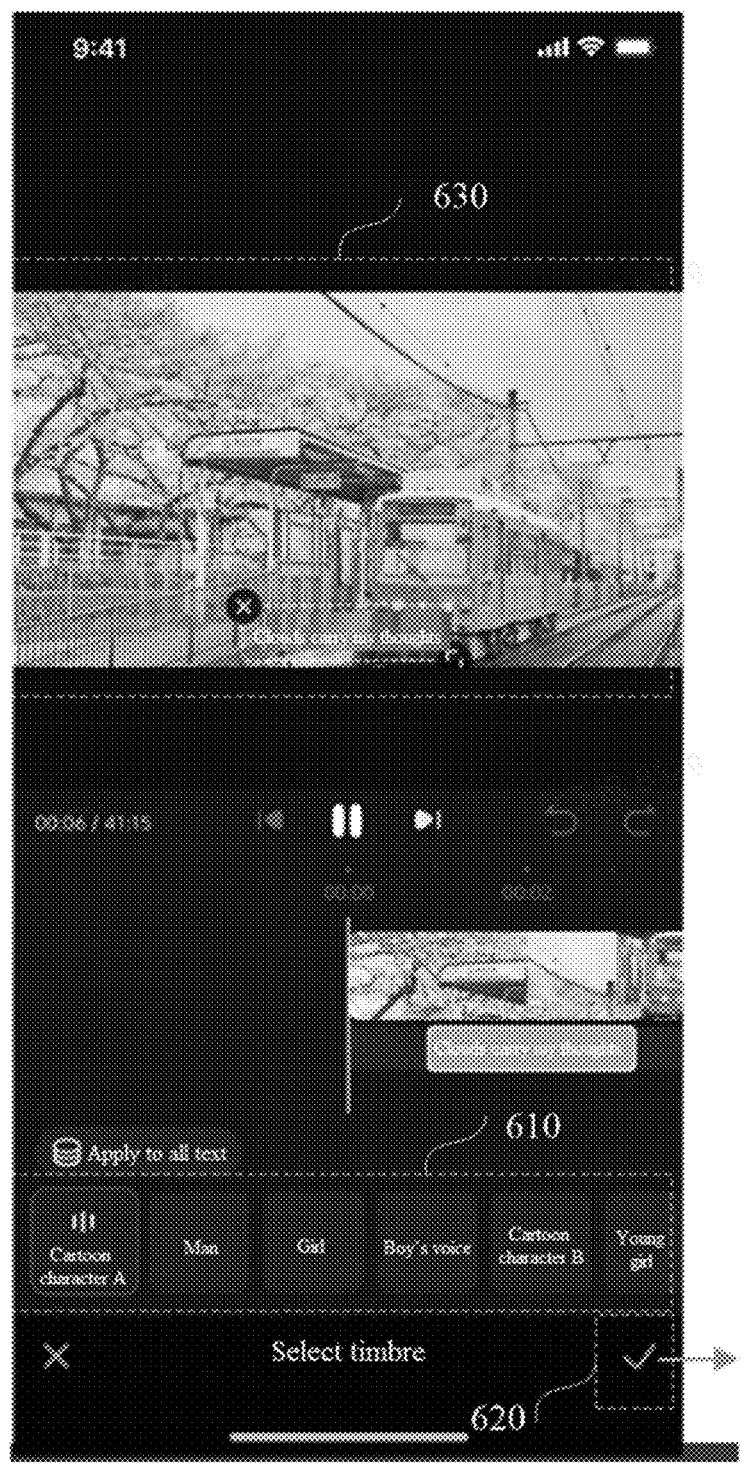
FIG. 4 is a schematic diagram of a video editing interface according to an embodiment of the present disclosure.
Figure 5:
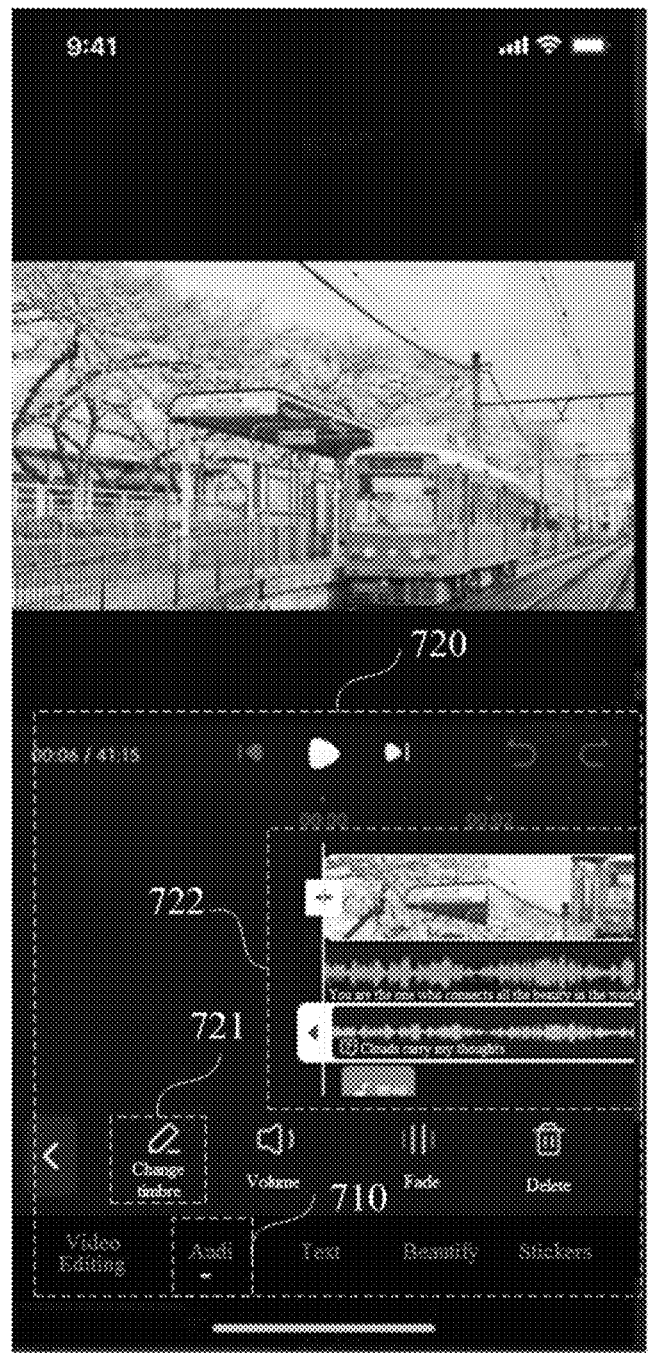
FIG. 5 is a schematic diagram of a video editing interface according to an embodiment of the present disclosure.

In one implementation, for the added text content in the target video rather than the text content inputted by the user, the user may select the to-be-edited text content and then trigger the first control displayed in the video editing interface to call up the timbre selection panel. As shown in FIG. 3, which illustrates a schematic diagram of a video editing interface, the text content 510 is the text content that has been added to the target video. The user selects the text content 510 and then triggers the first control 520. In an embodiment, the first control 520 may be a text-to-speech control. As shown in FIG. 4, which illustrates a schematic diagram of a video editing interface, the user selects a specific timbre from the timbre selection panel 610 in which the first timbre from the left is defaulted as being selected, and the text content is read with the selected timbre. Each time the user switch the selected timbre, the system re-reads the text content with the selected timbre and may play the video clip (to which the target audio is to be added) in the target video that matches the position for adding the target audio in the preview window 630, to enable the user to preview the effect of adding the target audio to the target video. When the user triggers the confirmation control 620 in the video editing interface as shown in FIG. 4, the system adds the target audio in the target timbre, which is generated for the text content, to the target video, and displays the video editing interface as shown in FIG. 5, where the timbre panel is cancelled and the prompt message "Audio has been generated and can be viewed in the audio module" is displayed.

In one implementation, the target video includes multiple first objects, and in response to a triggering operation acting on the second control, each of the first objects in the target video are converted into a second object with a third feature, to present the second object with the third feature during a process of playing the target video.

As an example, in a case of text-to-speech, the second control is a control for applying to all text. In addition to the text currently inputted by the user through the first operation region, the target video may have original subtitles or originally inputted text. When the user triggers the second control, all the pieces of text in the target video are converted into audios in the target timbre, and then the audios are added to the target video, thereby achieving batch generation of audios for multiple pieces of text and adding the audios to the target video. In other words, when the user triggers the second control, the currently selected target timbre may be applied to all text in the target video, audios in the target timbre are generated for all pieces of text in the target video, and the audios are added to the target video. It should be noted that if there are already target audios with a first target timbre generated for some of text content in the target video, then the target audios in the second target timbre selected by "Apply to all text" will replace the existing target audios with the first target timbre. In this way, it significantly facilitates the user to edit all the text in the target video without requiring the user to repeatedly perform editing interaction operations for each line of the text. In a case of text-to-animation, when the user triggers the second control, all the text in the target video is converted into animations of a target animation type, and the generated animations are added to the target video, to achieve batch generation of animations corresponding to multiple pieces of text and adding the animations to the target video. In a case of speech-to-special effect, when the user triggers the second control, all the voices in the target video are converted into special effects of a target type, and the generated special effects are added to the target video, to achieve batch generation of special effects corresponding to the voices and adding the special effects to the target video.

Further, in one implementation, after adding the second object with the second feature and the third feature to the target video, the video processing method further includes: displaying a second panel in the video editing interface; in response to a triggering operation acting on a third control in the second panel, adjusting the third feature of the second object.

In an embodiment, the first object is text, the second object is a voice, and the third feature of the second object is a timbre of the voice, that is, in case of text-to-speech, the second panel is displayed in the video editing interface, and the in response to a triggering operation acting on a third control in the second panel, adjusting the third feature of the second object, includes: displaying an audio panel in the video editing interface; in response to the triggering operation acting on the third control in the audio panel, adjusting the timbre of the target audio. In order to facilitate the understanding and usage by the user, the third control may specifically be a timbre-change control. Referring to FIG. 5, FIG. 5 shows a schematic diagram of a video editing interface displaying a second panel. In response to an instruction of selecting an audio tag 710 (i.e., the second panel 710) in the video editing interface, the audio panel 720 (i.e., the second panel 720) is displayed, the third control 721 (specifically, timbre-change control 721) is displayed in the second panel 720. When the user triggers the timbre-change control 721, a timbre selection panel is displayed, for which reference may be made to the timbre selection panel 610 shown in FIG. 4. With the timbre selection panel, the user may switch the target timbre of the target audio that has been added to the target video. When the user selects a specific timbre, the text content is read with the currently selected timbre. When the user confirms, the timbre of the existing target audio for the text content is changed to the timbre currently selected by the user. In other words, with the audio panel, the user can change the timbre of the target audio without switching to the homepage of the video editing interface (usually the video editing interface corresponding to the text tag), which simplifies user operations and improves the editing efficiency of the user.

In one implementation, further referring to FIG. 5, a first track and a second track are displayed in the panel region 722 of the audio panel 720. The first track presents an icon of an image frame of the target video, and the second track presents an icon of the first object. In an embodiment, the icon of the first object may be a text icon. The second track may alternatively present both text and audio icons. When the user triggers the icon of the first object, the first feature of the first object, i.e., the text content, is adapted to a specific operation (such as modification, deletion, dragging) of the user, while synchronously adjusting the second feature of the second object corresponding to the first object, where the second feature is the voice content corresponding to the text content, to realize the binding between the first object and the second object. When the first object changes, the corresponding second object is adjusted synchronously. In an embodiment, in response to the modification operation acting on the icon of the first object, the first feature of the first object is changed, and the second feature of the second object is synchronously adjusted; in response to the dragging operation acting on the icon of the first object, the video clip corresponding to the first object in the target video is changed, and the video clip corresponding to the second object in the target video is synchronously adjusted; in response to the deletion operation acting on the icon of the first object, the second object corresponding to the first object is synchronously deleted.

To illustrate the binding between the first object and the second object, the case where the first object is text, the second object is a voice and the third feature of the second object is the timbre of the voice is taken as an example. As long as a target audio is generated for the text content once, a binding is established between the text content and its corresponding target audio. In a case that the user changes the text content, the corresponding target audio is changed simultaneously to ensure the consistency between the text content and its corresponding target audio. Further, before regenerating a new audio based on the modified text content and replacing the target audio with the new audio, the method further includes: displaying prompt information to prompt the user whether to synchronously modify the target audio; when receiving a confirmation instruction of modifying the target audio synchronously, continue to perform the operation of regenerating new audio based on the modified text content and replacing the target audio with the new audio. Before replacing the target audio with the new audio, prompt information is displayed, to improve the friendliness of the interaction and improve the user experience.

In one embodiment, as an example, in a case of text-to-speech, adding a second object with a second feature to the target video (i.e., adding a target audio with a target timbre to the target video, where the target audio is generated for the text content) includes: determining multiple voice clips corresponding to the first object with the first feature (i.e., determining multiple voice clips corresponding to the text content); determining multiple beat positions of a background audio in the target video; and aligning starting positions of the voice clips with respective beat positions in the background audio in sequence (for example, the multiple voice clips corresponding to the first object are voice clip 1, voice clip 2 and voice clip 3, and the multiple beat positions of the background audio in the target video are beat position A, beat position B and beat position C, then the starting position of voice clip 1 is aligned with beat position A, the starting position of voice clip 2 is aligned with the beat position B, and the starting position of voice clip 3 is aligned with beat position C). The multiple voice clips and the background audio are mixed based on the aligned positions to add a second object with the second feature to the target video.

In an embodiment, the determining multiple voice clips corresponding to the first object with the first feature includes: acquiring rhythm-and-texture fusion information corresponding to the first object with the first feature, i.e., acquiring the rhythm-and-texture fusion information corresponding to the text content; converting the rhythm-and-texture fusion information into phoneme and rhythm symbol information; inputting the phoneme and rhythm symbol information into a deep learning model to obtain multiple voice clips corresponding to the first object with the first feature. The determining the multiple beat positions of the background audio in the target video includes: acquiring the multiple beat positions of the background audio in the target video by using a beat detection model. By aligning the beat positions of the background audio in the target video with the start positions of the voice clips in sequence, a better target audio addition effect can be achieved, that is, starting to play the target audios at the beat positions, which can enhance the sense of melody of the video after adding the target audio to improve the effect of video editing.

Figure 6:
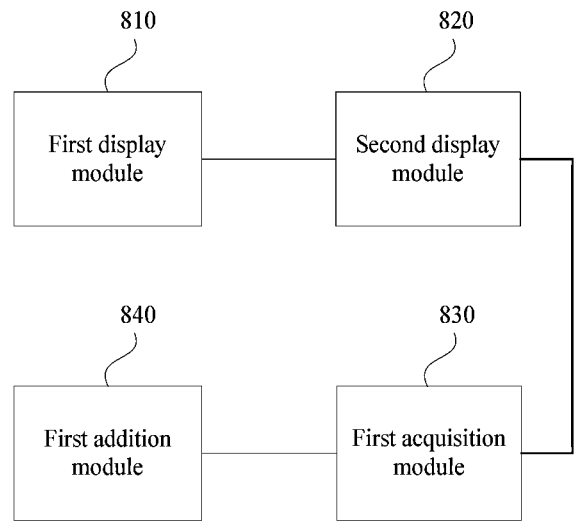
FIG. 6 is a schematic structural diagram of a video processing apparatus according to an embodiment of the present disclosure.

FIG. 6 is a schematic structural diagram of a video processing apparatus according to an embodiment of the present disclosure. The video processing apparatus provided by the embodiment of the present disclosure may be configured in the client. As shown in FIG. 6, in an embodiment, the video processing apparatus specifically includes: a first display module 810, a second display module 820, a first acquisition module 830 and a first addition module 840.

The first display module 810 is configured to display a first panel in response to a triggering operation acting on a first control in a video editing interface; where the first panel includes a first operation region for a first object; the second display module 820 is configured to display a first feature of the first object in the first operation region in response to an operation acting on the first operation region; the first acquisition module 830 is configured to acquire a second feature of a second object corresponding to the first feature; and the first addition module 840 is configured to add the second object with the second feature to a target video, to present the second object according to the second feature during a process of playing the target video.

In an embodiment, the first panel further includes a second operation region for the second object. The video processing apparatus further includes: a second acquisition module, configured to acquire a third feature of the second object in response to an operation acting on the second operation region, and add the second object with the second feature and the third feature to the target video, to present the second object according to the second feature and the third feature during the process of playing the target video.

In an embodiment, a preview window is presented in the video editing interface; the video processing apparatus further includes: a first playing module, configured to: before adding the second object with the second feature and the third feature to the target video, in response to the operation acting on the second operation region, play, in the preview window, a video clip in the target video that matches a position for adding the second object with the second feature and the third feature, and synchronously present the second object with the second feature and the third feature.

In an embodiment, the target video includes multiple first objects. The video processing apparatus further includes: a first conversion module, configured to convert each of the first objects in the target video to a second object with a third feature in response to a triggering operation acting on a second control, to present the second object with the third feature during the process of playing the target video.

In an embodiment, the first addition module 840 is further configured to: add the first object with the first feature to the target video, to display the first object with the first feature on the played video footage during the process of playing the target video.

The video processing apparatus further includes a second display module and a first adjustment module.

The second display module is configured to display a second panel in the video editing interface after adding the second object with the second feature and the third feature to the target video.

The first adjustment module is configured to adjust the third feature of the second object in response to a triggering operation of a third control in the second panel.

In an embodiment, the video processing apparatus further includes:
a third display module, configured to: after adding the second object with the second feature and the third feature to the target video, display a first track and a second track in the video editing interface, where the first track is configured to present an icon of an image frame of the target video, and the second track is configured to present an icon of the first object.

In an embodiment, the video processing apparatus further includes: a second adjustment module, configured to implement at least one of the following operations:
in response to a modification operation acting on the icon of the first object, change the first feature of the first object and synchronously adjust the second feature of the second object;
in response to a dragging operation acting on the icon of the first object, change a video clip in the target video corresponding to the first object and synchronously adjust a video clip in the target video corresponding to the second object; and
in response to a deleting operation acting on the icon of the first object, synchronously delete the second object corresponding to the first object.

In an embodiment, the first object is text, the first feature is text content, the second object is a voice, and the second feature is voice content. The first addition module 840 includes:
a first determination unit, configured to determine multiple voice clips corresponding to the first object with the first feature; a second determination unit, configured to determine multiple beat positions of a background audio in the target video; an alignment unit, configured to align starting positions of the voice clips with respective beat positions of the background audio in sequence; a mixing unit, configured to mix the multiple voice clips and the background audio based on the aligned positions, to add the second object with second feature to the target video.

In an embodiment, the first determination unit is further configured to acquire rhythm-and-texture fusion information corresponding to the first object with the first feature; convert the rhythm-and-texture fusion information into phoneme and rhythm symbol information; and input the phoneme and rhythm symbol information into a deep learning model to obtain the plurality of voice clips corresponding to the first object with the first feature.

In an embodiment, the second determination unit is further configured to acquire the multiple beat positions of the background audio in the target video by using a beat detection model.

In the video processing apparatus provided by the embodiment of the present disclosure, the first panel is displayed in response to the triggering operation acting on a first control in a video editing interface, where the first panel includes the first operation region for the first object; in response to the triggering operation acting on the first operation region, a first feature of a first object is displayed in the first operation region; a second feature of a second object corresponding to the first feature is acquired; the second object with the second feature is added to the target video, to present the second object according to the second feature during a process of playing the target video. In this way, a second object with a second feature, which corresponds to real-time inputted first object with first feature, is added into the target video, to achieve the effect of presenting the second object with second feature during a process of playing the target video.

According to the embodiments of the present disclosure, the video processing apparatus can implement the steps performed by the client in the video processing method provided by the method embodiments of the present disclosure, which has execution steps and beneficial effects and are not repeated herein.

Figure 7:
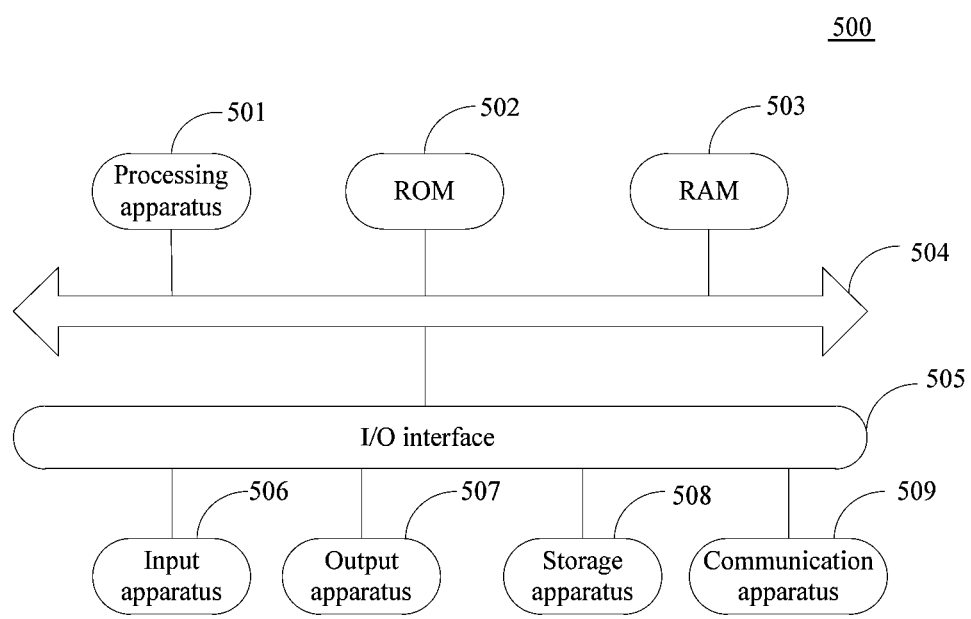
FIG. 7 is a schematic structural diagram of an electronic device according to an embodiment of the present disclosure.

FIG. 7 is a schematic structural diagram of an electronic device according to an embodiment of the present disclosure. Further referring to FIG. 7, it shows a schematic structural diagram of an electronic device 500 applicable for implementing the embodiments of the present disclosure. In the embodiments of the present disclosure, the electronic device 500 may include, but are not limited to, mobile terminals, such as mobile phones, laptops, digital broadcast receivers, PDAs (personal digital assistants), PADs (tablet computers), PMPs (portable multimedia players), vehicle-mounted terminals (such as in-vehicle navigation terminals, wearable electronic devices and the like, and fixed terminals such as digital TVs, desktop computers, smart home devices and the like. It should be noted that the electronic device 500 shown in FIG. 7 is only an example, which should not limit the functions and usage scope of the embodiments of the present disclosure.

As shown in FIG. 7, the electronic device 500 may include a processing apparatus 501 (such as a central processing unit and a graphics processor) which may execute various operations and processing through a program stored in a Read Only Memory (ROM) 502 or a program loaded from the storage 508 into a Random Access Memory (RAM) 503. The RAM 503 is further configured to store various programs and data required by the electronic device 500. The processing apparatus 501, the ROM 502 and the RAM 503 are connected to each other via a bus 504. An Input/output (I/O) interface 505 is also connected to the bus 504.

Generally, the I/O interface 505 may be connected to: an input apparatus 506, such as a touch screen, a touch panel, a keyboard, a mouse, a camera, a microphone, an accelerometer, and a gyroscope; an output apparatus 507, such as a liquid crystal display (LCD), a speaker, and a vibrator; a storage 508 such as a magnetic tape and a hard disk; and a communication apparatus 509. The communication apparatus 509 enables the electronic device 500 to perform wireless or wired communication with other devices for data exchanging. Although FIG. 7 shows an electronic device 500 having various apparatuses, it should be understood that the illustrated apparatuses are not necessarily required to all be implemented or included. Alternatively, more or fewer apparatuses may be implemented or included.

Particularly, according to some embodiments of the present disclosure, the process described above in conjunction with flow charts may be implemented as a computer program. For example, a computer program product is further provided according to some embodiments of the present disclosure, including a computer program carried on a non-transitory computer readable medium. The computer program includes program codes for performing the method shown in the flow charts. In the embodiments, the computer program may be downloaded and installed from a network via the communication apparatus 509, or installed from the storage 508, or installed from the ROM 502. When the computer program is executed by the processing apparatus 501, the above-mentioned functions defined in the video processing method according to the embodiments of the present disclosure are performed.

It should be noted that, the computer readable medium mentioned herein may be a computer readable signal medium or a computer readable storage medium or any combination thereof. The computer readable storage medium may be, but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In some embodiments of the present disclosure, the computer readable storage medium may be any tangible medium containing or storing a program, and the program may be used by or in combination with an instruction execution system, apparatus, or device. In some embodiments of the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium and can send, propagate or transmit programs to be used by or with an instruction execution system, apparatus or device. The program codes stored in the computer readable medium may be transmitted via any proper medium including but not limited to: wired, optical fiber cable, radio frequency (RF), or any suitable combination of the foregoing.

In some embodiments, clients and servers can communicate using any currently known or future developed network protocols, such as Hyper Text Transfer Protocol (HTTP), and can be interconnected with any form or medium of digital data communication (e.g., a communication network). Examples of communication networks include local area networks ("LANs"), wide area networks ("WANs"), internetworks (e.g., the Internet), and peer-to-peer networks (e.g., ad hoc peer-to-peer networks), as well as any currently known or future developed networks.

The computer readable medium may be included in the above electronic device or may exist independently without being assembled into the electronic device.

The computer readable medium carries one or more programs, and when the above one or more programs are executed by the electronic device, it can cause the electronic device to implement as follows: in response to a triggering operation acting on a first control in a video editing interface, displaying a first panel; wherein the first panel includes a first operation region for a first object; in response to an operation acting on the first operation region, displaying a first feature of the first object in the first operation region; acquiring a second feature of a second object corresponding to the first feature; and adding the second object with the second feature to a target video, to present the second object according to the second feature while playing the target vide.

In an embodiment, when the above one or more programs are executed by the electronic device, the electronic device may implement other steps in the above embodiments.

Computer program code for performing operations in embodiments of the present disclosure may be written in one or more programming languages, or a combination thereof. The programming language includes, but is not limited to, an object oriented programming language, such as Java, Smalltalk, and C++, or conventional procedural programming languages, such as "C" language and the like. The program code may be executed entirely on a user computer, or be executed partly on the user computer, or be executed as a stand-alone software package, or be executed partly on the user computer and partly on a remote computer or be executed entirely on the remote computer or server. In a case that the execution of the program code involves a remote computer, the remote computer may be connected to a user computer via any network, including a local area network (LAN) or a wide area network (WAN), or may be connected to an external computer (for example, via an Internet provided by an Internet service provider).

The flow charts and schematic diagrams in the Figures show the architecture, functionality and operations of possible implementations of the system, method and computer program product provided according to the embodiments of the present disclosure. Each of blocks in the flow charts or schematic diagrams may represent a module, a program segment, or a part of code, and the module, the program segment, or the part of code includes one or more executable instructions for implementing specified logical functions. It should be noted that in some alternative implementations, the functions noted in the blocks may be implemented in a different order than those illustrated in the Figures. For example, two blocks shown in succession may in fact be executed substantially in parallel, or sometimes be executed in a reverse order, depending upon functions involved. It should be further noted that each block in the schematic diagrams and/or flow charts, and combinations of blocks in the schematic diagrams and/or flowcharts, may be implemented by a dedicated hardware-based system configured to implement specified functions or operations, or may be implemented by using a combination of dedicated hardware and computer instructions.

The units mentioned in the description of the embodiments of the present disclosure may be implemented by means of software, or otherwise by means of hardware. The designation of a unit does not in any case constitute a limitation to the unit itself.

The functions described herein above may be executed at least in part by one or more hardware logic components. For example, without limitation, exemplary types of hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical Devices (CPLDs) and the like.

In the context of the present disclosure, a machine readable medium may be a tangible medium that may contain or store a program to be used by or in combination with an instruction execution system, apparatus or device. The machine readable medium may be a machine readable signal medium or a machine readable storage medium. The machine readable medium may include, but is not limited to, a system, an apparatus, or a device in an electronic, magnetic, optical, electromagnetic, infrared, or semi-conductive form, or any proper combination thereof. The machine readable storage medium may include an electrical connection based on one or more wires, a portable computer disk, a hard disk, a Random Access Memory (RAM), a Read Only Memory (ROM), an Erasable Programmable Read Only Memory (EPROM or flash memory), an optical fiber, a portable compact disc read only memory (CD-ROM), a light storage device, a magnetic storage device or any proper combination thereof.

According to one or more embodiments of the present disclosure, a video processing method is provided according to the present disclosure, and the method includes: in response to a triggering operation acting on a first control in a video editing interface, displaying a first panel; wherein the first panel includes a first operation region for a first object; in response to an operation acting on the first operation region, displaying a first feature of the first object in the first operation region; acquiring a second feature of a second object corresponding to the first feature; and adding the second object with the second feature to a target video, to present the second object according to the second feature during a process of playing the target video.

According to one or more embodiments of the present disclosure, in the video processing method of the present disclosure, the first panel further includes a second operation region for the second object; the method further includes: in response to an operation acting on the second operation region, acquiring a third feature of the second object, and adding the second object with the second feature and the third feature to the target video, to present the second object according to the second feature and the third feature during the process of playing the target video.

According to one or more embodiments of the present disclosure, in the video processing method of the present disclosure, where a preview window is presented in the video editing interface, and before adding the second object with the second feature and the third feature to the target video, the method further includes: in response to the operation acting on the second operation region, playing, in the preview window, a video clip in the target video that matches a position for adding the second object with the second feature and the third feature, and synchronously presenting the second object with the second feature and the third feature.

According to one or more embodiments of the present disclosure, in the video processing method of the present disclosure, where the target video includes multiple first objects; the method further includes: in response to a triggering operation acting on a second control, converting each of the first objects in the target video to a second object with a third feature, to present the second object with the third feature during a process of playing the target video.

According to one or more embodiments of the present disclosure, in the video processing method of the present disclosure, the method further includes: adding the first object with the first feature to the target video, to display the first object with the first feature on the played video footage during a process of playing the target video.

According to one or more embodiments of the present disclosure, in the video processing method of the present disclosure, after adding the second object with the second feature and the third feature to the target video, the method further includes: displaying a second panel in the video editing interface; and in response to a triggering operation acting on a third control of the second panel, adjusting the third feature of the second object.

According to one or more embodiments of the present disclosure, in the video processing method of the present disclosure, after adding the second object with the second feature and the third feature to the target video, the method further includes: displaying a first track and a second track in the video editing interface, where the first track is configured to present an icon of an image frame of the target video, and the second track is configured to present an icon of the first object.

According to one or more embodiments of the present disclosure, in the video processing method of the present disclosure, the method further includes at least one of: in response to a modification operation acting on the icon of the first object, changing the first feature of the first object and synchronously adjusting the second feature of the second object; in response to a dragging operation acting on the icon of the first object, changing a video clip in the target video corresponding to the first object and synchronously adjusting a video clip in the target video corresponding to the second object; and in response to a deleting operation acting on the icon of the first object, synchronously deleting the second object corresponding to the first object.

According to one or more embodiments of the present disclosure, in the video processing method of the present disclosure, in a case where the first object is text, the first feature is text content, the second object is a voice, and the second feature is voice content; the adding the second object with the second feature to the target video includes: determining multiple voice clips corresponding to the first object with the first feature; determining multiple beat positions of a background audio in the target video; aligning starting positions of the voice clips with respective beat positions of the background audio in sequence; and mixing, based on the aligned positions, the multiple voice clips with the background audio, to add the second object with the second feature to the target video.

According to one or more embodiments of the present disclosure, in the video processing method of the present disclosure, the determining the multiple voice clips corresponding to the first object with the first feature includes: acquiring rhythm-and-texture fusion information corresponding to the first object with the first feature; converting the rhythm-and-texture fusion information into phoneme and rhythm symbol information; and inputting the phoneme and rhythm symbol information into a deep learning model to obtain the multiple voice clips corresponding to the first object with the first feature; the determining the multiple beat positions of the background audio in the target video includes: acquiring the multiple beat positions of the background audio in the target video by using a beat detection model.

According to one or more embodiments of the present disclosure, a video processing apparatus is provided according to the present disclosure. The apparatus includes: a first display module, configured to display a first panel in response to a triggering operation acting on a first control in a video editing interface; wherein the first panel includes a first operation region for a first object; a second display module, configured to display a first feature of the first object in the first operation region in response to an operation acting on the first operation region; a first acquisition module, configured to acquire a second feature of a second object corresponding to the first feature; and a first addition module, configured to add the second object with the second feature to a target video, to present the second object according to the second feature during a process of playing the target video.

According to one or more embodiments of the present disclosure, an electronic device is provided according to the present disclosure. The electronic device includes:
one or more processors; and
a storage, configured to store one or more programs;
where the one or more programs, when executed by the one or more processors, cause the one or more processors to implement the video processing method according to any one of the embodiments of the present disclosure.

According to one or more embodiments of the present disclosure, a computer readable store medium is provided according to the present disclosure. The computer readable store medium stores a computer program thereon; where the computer program, when executed by a processor, implements the video processing method according to any one of the embodiments of the present disclosure.

According to one or more embodiments of the present disclosure, a computer program product is provided according to the present disclosure. The computer program product includes computer programs or computer instructions; where the computer programs or computer instructions, when executed by a processor, implement the video processing method according to any one of the embodiments of the present disclosure.

The above description merely illustrates the preferred embodiments of the present disclosure and the technical principles employed. Those skilled in the art should understand that the scope of present disclosure is not limited to the technical solutions formed by certain combination of the above-mentioned technical features, and should also cover other technical solutions formed by any combination of the above-mentioned technical features and any equivalent features without departing from the disclosed concept. For example, a technical solution formed by replacing the features with the technical features disclosed in the present disclosure (but not limited to) with similar functions.

In addition, although the above operations are described in a specific order, it should not be understood that these operations are required to be performed in the specific order or performed in a sequential order. In some conditions, multitasking and parallel processing may be advantageous. Similarly, although multiple implementation details are included in the above descriptions, the details should not be interpreted as limitations to the scope of the present disclosure. Some features described in the context of an individual embodiment may also be implemented in combination in an individual embodiment. Otherwise, the features described in the context of an individual embodiment may be implemented individually or in any suitable sub-combination form in multiple embodiments.

Although the subject of the present disclosure has been described according to the structural features and/or logical actions of the method, it should be understood that the subject defined in the claims is not necessarily limited to the features or actions described above. Rather, the specific features and actions described above are only examples of the implementations of the claims.

The invention claimed is:

1. A video processing method, comprising:
   in response to a triggering operation on a first control, displaying a first operation region for a first object;
   in response to an operation on the first operation region, displaying a first feature of the first object in the first operation region; and
   adding a second object with a second feature and a third feature to a target video, to provide the second object according to the second feature and the third feature during a process of playing the target video, wherein the second feature is generated based on the first feature;
   wherein the target video comprises a plurality of first objects, and the method further comprises:
   in response to a triggering operation on a second control, converting each first object of the plurality of first objects in the target video to a respective second object of a plurality of second objects, to provide the second object during the process of playing the target video.

2. The method according to claim 1, further comprising: acquiring the second feature of the second object.

3. The method according to claim 1, further comprising: displaying a second operation region for the second object; and
   in response to an operation on the second operation region, acquiring the third feature of the second object.

4. The method according to claim 1, wherein a preview window is presented in a video editing interface, and before adding the second object with the second feature and the third feature to the target video, the method further comprises:
   in response to the operation on the second operation region, playing, in the preview window, a video clip in the target video that matches a position for adding the second object with the second feature and the third feature, and synchronously providing the second object with the second feature and the third feature.

5. The method according to claim 1, further comprising: adding the first object with the first feature to the target video, to display the first object with the first feature on played video footage during the process of playing the target video.

6. The method according to claim 1, wherein after adding the second object with the second feature and the third feature to the target video, the method further comprises:
   in response to a triggering operation on a third control, adjusting the third feature of the second object.

7. The method according to claim 1, wherein after adding the second object with the second feature and the third feature to the target video, the method further comprises:
   displaying a first track and a second track in a video editing interface, wherein the first track is configured to present an icon of an image frame of the target video, and the second track is configured to present an icon of the first object.

8. The method according to claim 7, further comprising at least one of:
   in response to a modification operation on the icon of the first object, changing the first feature of the first object and synchronously adjusting the second feature of the second object;
   in response to a dragging operation on the icon of the first object, changing a video clip in the target video corresponding to the first object and synchronously adjusting a video clip in the target video corresponding to the second object; and
   in response to a deleting operation on the icon of the first object, synchronously deleting the second object corresponding to the first object.

9. The method according to claim 1, wherein the first object is text, the first feature is text content, the second object is a voice, and the second feature is voice content; the adding the second object with the second feature to the target video comprises:
   determining a plurality of voice clips corresponding to the first object with the first feature;
   determining a plurality of beat positions of a background audio in the target video;
   aligning starting positions of the voice clips with respective beat positions of the background audio in sequence; and
   mixing, based on the aligned positions, the plurality of voice clips with the background audio, to add the second object with the second feature to the target video.

10. The method according to claim 9, wherein
    the determining the plurality of voice clips corresponding to the first object with the first feature comprises:
    acquiring rhythm-and-texture fusion information corresponding to the first object with the first feature; and
    converting the rhythm-and-texture fusion information into phoneme and rhythm symbol information; and
    inputting the phoneme and rhythm symbol information into a deep learning model to obtain the plurality of voice clips corresponding to the first object with the first feature;
    the determining the plurality of beat positions of the background audio in the target video comprises:
    acquiring the plurality of beat positions of the background audio in the target video by using a beat detection model.

11. An electronic device, comprising:
    one or more processors; and
    a storage, configured to store one or more programs;
    wherein the one or more programs, when being executed by the one or more processors, cause the one or more processors to implement:
    in response to a triggering operation on a first control, displaying a first operation region for a first object;
    in response to an operation on the first operation region, displaying a first feature of the first object in the first operation region; and
    adding a second object with a second feature and a third feature to a target video, to provide the second object according to the second feature and the third feature during a process of playing the target video, wherein the second feature is generated based on the first feature;
    wherein the target video comprises a plurality of first objects, and the method further comprises:
    in response to a triggering operation on a second control, converting each first object of the plurality of first objects in the target video to a respective second object of a plurality of second objects, to provide the second object during the process of playing the target video.

12. The electronic device according to claim 11, the one or more processors are further configured to implement:

displaying a second operation region for the second object; and in response to an operation on the second operation region, acquiring the third feature of the second object.

13. The electronic device according to claim 11, wherein a preview window is presented in a video editing interface, and before adding the second object with the second feature and the third feature to the target video, the one or more processors are further configured to implement:

in response to the operation on the second operation region, playing, in the preview window, a video clip in the target video that matches a position for adding the second object with the second feature and the third feature, and synchronously providing the second object with the second feature and the third feature.

14. The electronic device according to claim 11, wherein the one or more processors are further configured to implement:

adding the first object with the first feature to the target video, to display the first object with the first feature on played video footage during the process of playing the target video.

15. The electronic device according to claim 11, wherein after adding the second object with the second feature and the third feature to the target video, the one or more processors are further configured to implement:

in response to a triggering operation on a third control, adjusting the third feature of the second object.

16. The electronic device according to claim 11, wherein after adding the second object with the second feature and the third feature to the target video, the one or more processors are further configured to implement:

displaying a first track and a second track in a video editing interface, wherein the first track is configured to present an icon of an image frame of the target video, and the second track is configured to present an icon of the first object.

17. The electronic device according to claim 16, wherein the one or more processors are further configured to implement at least one of:

in response to a modification operation on the icon of the first object, changing the first feature of the first object and synchronously adjusting the second feature of the second object;

in response to a dragging operation on the icon of the first object, changing a video clip in the target video corresponding to the first object and synchronously adjusting a video clip in the target video corresponding to the second object; and in response to a deleting operation on the icon of the first object, synchronously deleting the second object corresponding to the first object.

18. A non-transitory computer readable store medium storing a computer program thereon, wherein the computer program, when being executed by a processor, implements:

in response to a triggering operation on a first control, displaying a first operation region for a first object;

in response to an operation on the first operation region, displaying a first feature of the first object in the first operation region; and adding a second object with a second feature and a third feature to a target video, to provide the second object according to the second feature and the third feature during a process of playing the target video, wherein the second feature is generated based on the first feature;

wherein the target video comprises a plurality of first objects, and the method further comprises:

in response to a triggering operation on a second control, converting each first object of the plurality of first objects in the target video to a respective second object of a plurality of second objects, to provide the second object during the process of playing the target video.

* * * * *